April 25, 1944.  L. G. LINDSAY  2,347,201

WATER SOFTENING APPARATUS

Filed Feb. 2, 1942  2 Sheets-Sheet 1

Inventor
Lynn G. Lindsay
By John E. Strypker Jr.
Attorney

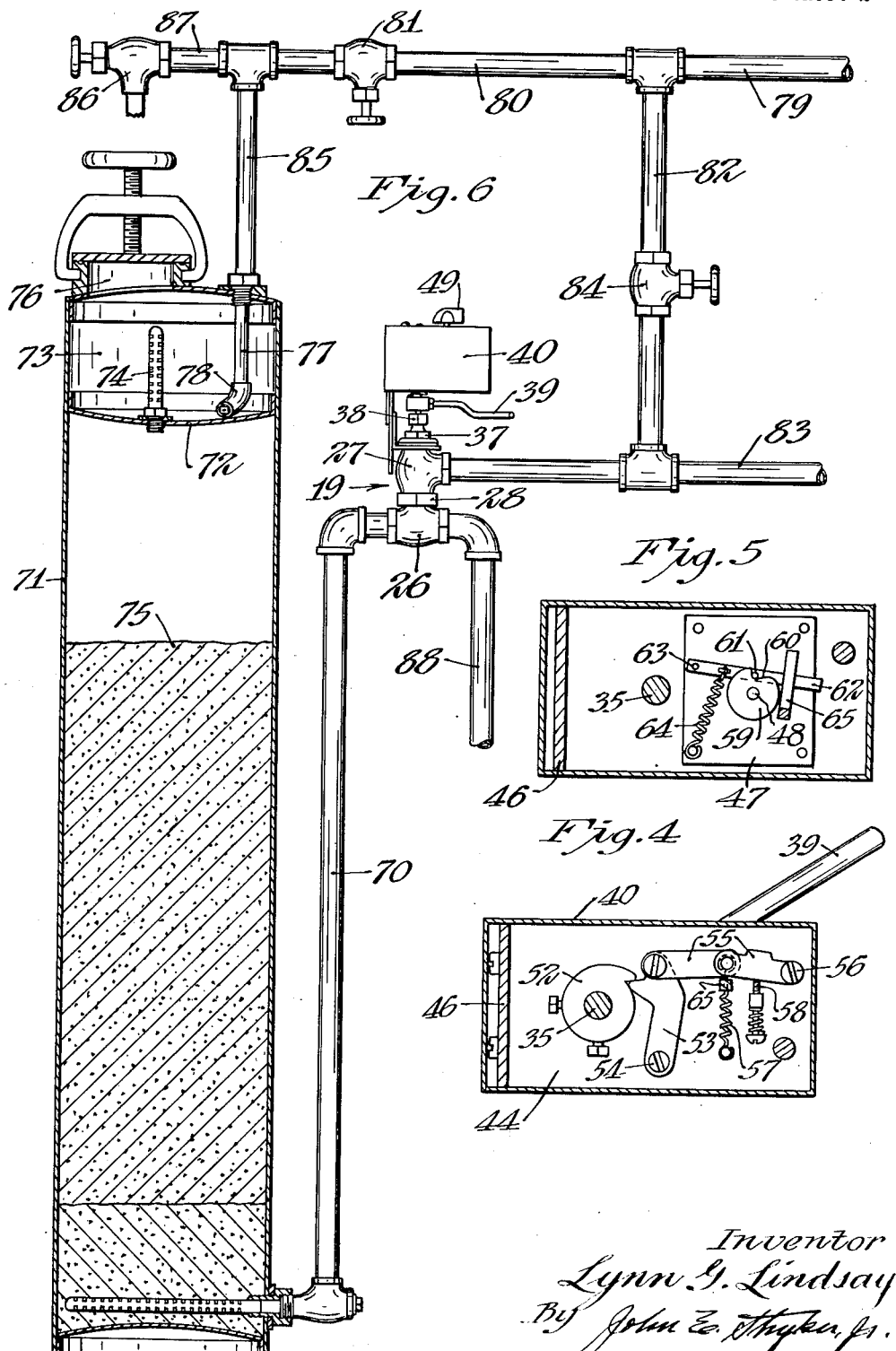

Patented Apr. 25, 1944

2,347,201

UNITED STATES PATENT OFFICE 2,347,201

WATER SOFTENING APPARATUS

Lynn G. Lindsay, Chicago, Ill.

Application February 2, 1942, Serial No. 429,155

4 Claims. (Cl. 210—24)

This invention relates to water softening apparatus of the type wherein the water to be softened is passed through a body of softening material which requires regeneration periodically.

The principal objects of my invention are to shorten the time required for efficient regeneration, to provide a water softener tank with novel means for rapidly dissolving the salt or other regenerating chemical therein and to provide simple and inexpensive means for minimizing the manual work required for operation of apparatus of this character.

Other objects will appear and be more fully pointed out in the following specification and claims.

Referring to the accompanying drawings:

Fig. 4 is a horizontal section through the timing mechanism and casing taken on the line 4—4 of Fig. 3;

Fig. 5 is a section taken on the line 5—5 of Fig. 3, and

Fig. 6 shows the application of my device to a downflow type of water softener, the tank being shown in central vertical section.

Figure 1:
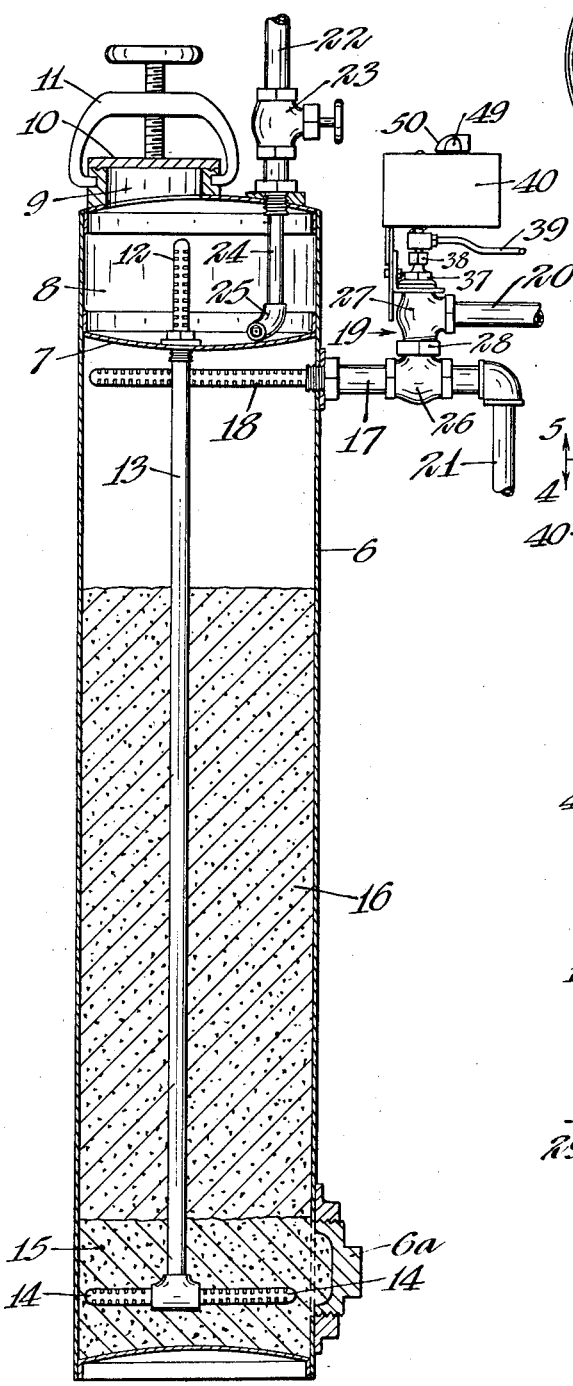
Figure 1 is a central vertical section through the tank of water softening apparatus of the up-flow type, embodying my invention in its preferred form.
Figure 2:
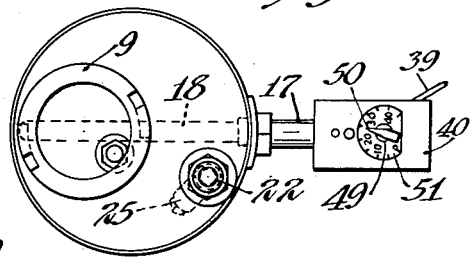
Fig. 2 is a plan view of the tank and fittings and with the hand hole cover removed.

Referring to Figs. 1 and 2, the numeral 6 indicates the main pressure tank which is provided with a partition 7 forming a separate, internal salt pot 8 in the upper portion of the tank. A hand hole 9 communicates with the top of the pot 8 and is provided with a removable cover 10 adapted to be fastened in closed position by a clamp 11 of the usual or suitable construction. A slotted strainer tube 12 projects up from the partition 7 and communicates at its lower end with a pipe 13 which extends to a point near the bottom of the tank 6. Slotted heads 14 distribute water from the pipe 13 beneath the bed of softening chemical. In accordance with the usual practice, these heads may be imbedded in a body of gravel 15 upon which the bed 16 of zeolites or other softening chemical is supported in the tank 6. Access to the interior of the tank 6 for the purpose of assembling the distributor heads 14 on the pipe 13 is allowed by providing a large opening and plug 6a near the bottom of the tank.

An outlet pipe 17 communicates with the tank 6 above the bed 16 and beneath the partition 7 and this pipe has a slotted strainer tube 18 connected to it within the tank. The pipe 17 extends to a three-port, two-way valve indicated generally by the numeral 19. Connected to one of the ports of the valve 19 is a service pipe 20 and a waste pipe 21 is connected to another port thereof, the valve being operable to place the pipe 17 in communication with either of the pipes 20 or 21. Hard water to be softened is supplied by a pipe 22 under control of a valve 23 and an end portion 24 of pipe 22 within the salt pot 8 extends downward and has a discharge nozzle 25 on its lower extremity. This nozzle is shaped like a 45-degree angle elbow and arranged to direct a stream of water obliquely downward against the partition 7 and circumferentially within the salt pot so that, in operation, a swirling turbulence is created in the bottom of the salt pot.

Figure 3:
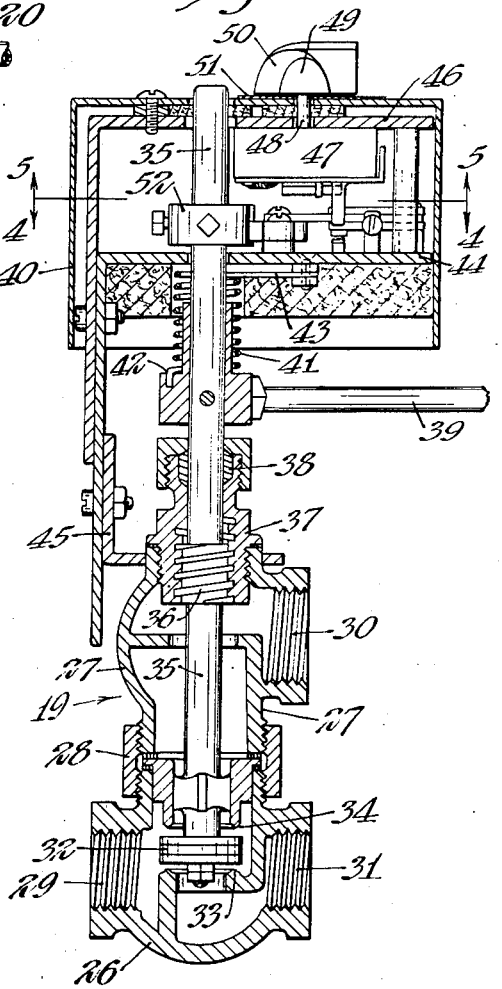
Fig. 3 is a central vertical section through the main control valve showing suitable mechanism for automatically operating the valve to terminate the period of regeneration and return the softener to normal service.

As best shown in Fig. 3, the valve indicated generally by the numeral 19 has a casing formed from a T-shaped fitting 26 and an elbow fitting 27, one end of the latter being joined to the central branch of the fitting 26 by a threaded coupling 28. These casing members have the parts 29, 30 and 31 connected respectively to the pipes 17, 20 and 21. A valve closure head 32 extends parallel to and between annular seats 33 and 34 and the passages within the valve are so arranged that when the head 32 is closed against the seat 33 the port 31 is closed and the port 29 is in communication with the port 30 and when the head is closed against the seat 34 communication between the ports 29 and 31 is established and communication between the ports 29 and 30 is cut off. The head 32 is fixed on the lower end of an operating rod 35 and the latter has a threaded portion 36 engaging in a nut 37 which is mounted at the top of the fitting 27.

The rod 35 extends through a packing gland 38 at the top of the valve casing and then up through bearings in a supporting frame for the clock-controlled latch mechanism hereinafter described. A manually operable lever 39 is fixed on the rod for turning it and above the lever is a coiled spring 41 and a casing 40 containing clock-controlled latch mechanism. The spring 41 is arranged to turn the rod 35 in such direction as to normally close the valve head 32 against the seat 33. And end 42 of the spring 41 is anchored on the handle 39 and the other end 43 is anchored on a fixed plate 44 which extends horizontally and is supported on a bracket 45 attached to the valve casing. The spring 41 is maintained under sufficient tension to turn the rod 35 in the appropriate direction when released by the latch mechanism now to be described.

A second horizontal plate 46 is mounted in spaced parallel relation to the plate 44 and a clock mechanism in a case 47 is mounted on the bottom of the plate 46 and provided with an upwardly extending spindle 48 which projects from the top of the housing 40 and is provided with a knob 49 and pointer 50. A dial 51 on the top of the casing 40 is graduated in minutes so that the pointer 50 may be set for the time interval required for regeneration and washing. A cam 52 formed with a projecting lug is fixed on the valve rod 35 adjacent to the top surface of the plate 44 and, as best shown in Fig. 4, this cam is adapted to coact with a dog 53 having a pivot screw 54 connecting one end of it to the plate 44. The opposite end of the dog 53 is connected to toggle members 55 having their ends remote from the dog fastened to the plate 44 by a pivot screw 56. These toggle members are normally held by a coiled spring 57 in substantially aligned position against a stop screw 58.

Clock operated trip mechanism for the toggle members 55 is mounted on the bottom of the case 47. The mechanism includes a cam disk 59 mounted on the lower end of the spindle 48 and formed with a notch 60 to receive a pin 61 projecting from a pivoted arm 62. This arm has a pivot pin 63 connecting one end to the case 47 and a small coiled spring 64 arranged to retain the pin 61 in engagement with the cam 59. A finger 65 is rigidly attached to the arm 62 and projects laterally and downward therefrom to strike the toggle members 55 laterally at their junction when the cam 59 is in position to receive the pin 61 in the notch 60.

In the arrangement of the invention as applied to a down-flow type of water softener shown in Fig. 6, a pipe 70 connects the bottom of the softener tank 71 to the port 29 of the semi-automatic valve 19. A partition 72 forms a salt pot 73 in the top of the tank 71 and a strainer pipe 74 extends upward from the partition 72 and communicates with the top of the compartment containing the bed 75 of softening material. The down-flow apparatus shown in Fig. 6 is further similar to the up-flow type of apparatus in that it has a hand hole 76 provided with a removable cover and a water supply pipe 77 terminating in a nozzle 78 similar to the nozzle 25 in the salt pot. The external pipe connections provide for back washing the bed 75 and include a hard water supply pipe 79 having a branch 80 under control of a valve 81 and a branch 82 extending to the service pipe 83 under control of a valve 84. Another branch of the service pipe is connected to the valve port 30. Valve 81 controls the supply of water to a pipe 85 connected to the pipe 77 and a waste pipe 87 branches from pipe 85, being provided with a valve 86.

Operation

In the operation of the preferred form of the invention, shown in Figs. 1 to 5 inclusive, during normal service the water is admitted to the softening tank 6 through the pipe 22, the valve 23 being open, and flows first into the salt pot 8 from which it passes into the strainer tube 12, through the pipe 13 and distributor heads 14, thence rises through the body of softening material 16, being finally forced out through the strainer tube 18 and pipes 17 and 20, the valve head 32 being closed against the lower seat 33 and open at the upper seat 34.

When it is desired to regenerate the softening material 16 the valve 23 is first closed and then the timing mechanism knob 49 is turned so that the hand 50 indicates the desired period for regeneration and washing. By thus turning the spindle 48 the clock spring is wound and the cam 59 is turned counter-clockwise, Fig. 5, thereby forcing pin 61 out of notch 60, moving finger 65 away from the toggle members 55 and releasing spring 57 to actuate dog 53 toward cam 52. This sets the trip mechanism so that the valve stem 35 may be locked in regenerating position. Now the operator moves hand lever 39 in counter-clockwise direction as viewed from the top, to turn the rod 35 and move the valve head 32 upward until it closes against the seat 34 thereby opening communication between the softener outlet pipe 17 and waste pipe 21 through the ports 29 and 31. The valve is locked in this position by engagement of the lug on cam 52 with dog 53, as shown in Fig. 4, the dog being normally held against the cam by the action of the spring 57 acting through the toggle members 55.

After setting the timing mechanism to lock the valve head 32 in regenerating position the cover 10 of the hand hole 9 is removed and a predetermined quantity of dry salt or other regenerating chemical in granular form is charged into the salt pot 8, the cover 10 is replaced and the valve 23 is opened. This causes water to enter the salt pot through the pipe 24 and nozzle 25 and the latter directs the stream circumferentially and downward toward the partition 7 supporting the charge of salt. The resulting swirling turbulence causes the salt to be dissolved in a minimum of time and the solution flows out through the strainer tube 12, pipe 13 and distributor heads 14, whence it passes upward through the body of softening material 16 and flows out of the tank through the strainer tube 18, pipe 17, valve casing member 26 and waste pipe 21. The latter is preferably provided with a restriction which so limits the rate of flow as to obtain most efficient regeneration by retaining the salt solution in contact with the bed of softening material for the desired period of time. It is desirable to have clean water flow through the material 16 for a short period after the salt solution has been exhausted and to accomplish this the clock mechanism is set to allow flow to waste for a short period of time after the regeneration period. It has been found that the time required for regeneration may be substantially reduced by my arrangement for quickly producing a concentrated regeneration solution in the internal salt pot 8. By this arrangement salt is not only placed in solution rapidly, but I insure the complete and thorough washing out of the salt at the end of the period of regeneration.

The return of the softener to normal operation requires no attention on the part of the operator. After the setting of the clock mechanism at the start of regeneration the clock mechanism turns the spindle 48 carrying the pointer 50 and cam 59 toward the starting position slowly. At the end of the interval of time for which the mechanism has been set the notch 60 in cam 59 receives the pin 61 on the arm 62 and the latter is moved by the spring 64 to strike the toggle members 55 with the finger 65. This actuates the toggle members to withdraw the dog 53 from engagement with the lug on cam 52 whereupon the spring 41 turns the valve shaft 35 downward to close the head 32 against the seat 33.

Referring to the down flow type of apparatus shown in Fig. 6, during the normal softening operation the valves 84 and 86 are closed, the valve 81 is open and the head 32 of the valve 19 is closed against the seat 33 and open at the seat 34 so that hard water flows from the pipes 79, 80, 85 and 77 and nozzle 78 into the salt pot 73 whence it passes through the strainer pipe 74 to the top of the bed 75 down through the bed and out through the pipe 70, valve 19 and service pipe 83. To prepare for regeneration, the valve 81 is closed and the timing mechanism and valve lever 39 are adjusted as hereinbefore described so that the valve head 32 is locked in the position where it is closed against the seat 34 and open at the seat 33. The charge of salt is now placed in the pot 73, the hand hole 76 is closed and then the valve 81 is opened. This delivers a stream of water from the nozzle 78 which rapidly places the salt in solution and causes the solution to flow from strainer pipe 74, downward through the bed 75 and out through the pipes 70 and 88 to waste. Regeneration of the bed followed by washing continues until the timing mechanism trips the valve 19 and returns the softener to normal operation as described with reference to the up-flow type of apparatus.

As it is desirable to back wash the bed of a softener of the down-flow type, I have provided for this in the arrangement illustrated in Fig. 6. During back washing the valve 81 is closed and the valves 84 and 86 are open so that water passes from the pipe 79 through pipes 82 and 83 to valve 19. The head 32 of valve 19 being closed at seat 33 and open at seat 34, the water flows through pipe 70, up through the bed 75 and out at the top through strainer pipe 74, nozzle 78 and pipes 77, 85 and 87, the latter being open to waste. Where back washing is unnecessary the valves 84 and 86 and the branch pipes controlled thereby may be eliminated. This makes the down-flow type of water softener shown in Fig. 6 as simple as the up-flow type. Except for back washing it is only necessary to operate one valve in addition to the semi-automatic valve 19 in order to initiate the regenerating cycle with either type of apparatus and both are returned to normal operation automatically after the regenerating period.

The nozzles 25 and 78 have restricted outlets which direct streams of high velocity around the walls and on the bottom of the salt compartments. Ordinarily, coarse grained, common salt is used as the regenerating material and the granules are kept in motion by the action of the nozzles until all of them have been dissolved. They are thus prevented from settling in a stationary mass. The centrally located strainer tubes 12 and 74 collect the solution at various depths from the portion of the pool where there is the least turbulence and with a minimum of obstruction to the swirling action. It has been found that as a result of this arrangement the concentrated solution of the salt is caused to flow through the softener bed without loss of time and that the period required for proper and complete regeneration and return of the softener to normal operation is greatly reduced.

Having described my invention, what I claim as new and desire to protect by Letters Patent is:

1. Water softening apparatus comprising, a pressure tank containing a body of water softening material of the type requiring periodic regeneration means for supplying water to said tank, means for supplying a regenerating solution to said body, an outlet for liquid connected to said tank, a soft water service pipe, a waste pipe, a valve casing having a port communicating with said outlet and additional ports communicating respectively with the service pipe and waste pipe, spaced parallel seats, formed in the casing, a head movable to close against either of said seats to control the direction of flow through the casing, a longitudinally movable valve stem connected to said head, manually operable means for setting said head in closed position against one of said seats for placing the tank outlet in communication with the waste pipe and time controlled means operable independently of the presence of regenerating solution in the apparatus for automatically reversing the movement of said stem to close said head against the other seat and thereby place the tank outlet in communication with the service pipe.

2. Water softening apparatus comprising, a pressure tank containing a body of water softening material of the type requiring periodic regeneration, means for supplying a soluble regenerating material to the tank, a water supply pipe connected to the tank, a manually operable valve for controlling the supply of water to the tank, an outlet for liquid connected to the tank, a service pipe, a waste pipe, a valve casing having a port communicating with said outlet and additional ports communicating respectively with the service pipe and waste pipe and semi-automatic valve mechanism comprising spaced parallel valve seats formed in said casing, a valve head extending between said seats to close against either of them, a longitudinally movable valve stem connected to said head, manually operable means for setting said head to close against one of said seats and time controlled means operable independently of the presence of regenerating material in the apparatus for automatically reversing the movement of said stem to close said head against the other seat.

3. Water softening apparatus comprising, a pressure tank containing a body of water softening material of the type requiring periodic regeneration means for supplying water to said tank, means for supplying a regenerating material to said body, an outlet for liquid connected to said tank, a soft water service pipe, a waste pipe, a three-port, two-way valve having a casing, a port communicating with said outlet, additional ports communicating with the service pipe and waste pipe respectively and valve mechanism for controlling the direction of flow through the casing, manually operable means for setting said mechanism to close communication between the outlet pipe and service pipe, while opening communication between the tank outlet and waste pipe, and time controlled means operable independently of the presence of regenerating material in the apparatus for automatically reversing the movement of the valve mechanism to close communication with the waste pipe and reestablish communication between the tank outlet and service pipe.

4. Water softening apparatus comprising, a pressure tank containing a body of water softening material of the type requiring periodic regeneration, means for supplying a regenerating material to said body, a water supply pipe connected to said tank, a manually operable valve controlling the water supply from said pipe, an outlet for liquid connected to said tank, a soft water service pipe, a waste pipe, a three-port, two-way valve having a casing, a port communicating with said outlet, additional ports communicating with the service pipe and waste pipe respectively and valve mechanism for controlling the direction of flow through the casing, manually operable means for setting said mechanism to close communication between the outlet pipe and service pipe while opening communication between the outlet pipe and waste pipe, and time controlled means operable independently of the presence of regenerating material in the apparatus for automatically reversing the movement of the valve mechanism to close communication with the waste pipe and re-establish communication between the tank outlet and service pipe.

LYNN G. LINDSAY.